(12) United States Patent
Kim et al.

(10) Patent No.: US 11,622,511 B2
(45) Date of Patent: Apr. 11, 2023

(54) SMART FARM SYSTEM

(71) Applicant: KOREA INSTITUTE OF INDUSTRIAL TECHNOLOGY, Cheonan-si (KR)

(72) Inventors: Young Won Kim, Gwangju (KR); Jung Bo Sim, Gwangju (KR); Jin Young Son, Gwangju (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 10 days.

(21) Appl. No.: 17/095,754

(22) Filed: Nov. 12, 2020

(65) Prior Publication Data

US 2021/0137025 A1    May 13, 2021

(30) Foreign Application Priority Data

Nov. 12, 2019 (KR) .................. 10-2019-0144074
Nov. 12, 2019 (KR) .................. 10-2019-0144075

(51) Int. Cl.
*F24H 15/39*    (2022.01)
*A01G 9/24*    (2006.01)
*G06Q 50/02*    (2012.01)

(52) U.S. Cl.
CPC ............. *A01G 9/245* (2013.01); *A01G 9/243* (2013.01); *F24H 15/39* (2022.01); *G06Q 50/02* (2013.01)

(58) Field of Classification Search
None
See application file for complete search history.

(56) References Cited

FOREIGN PATENT DOCUMENTS

| CN | 202660759 U | * | 1/2013 |
| CN | 203671812 U | * | 6/2014 |
| CN | 203757910 U | * | 8/2014 |
| CN | 106225318 A | * | 12/2016 |
| CN | 104913364 B | * | 11/2017 |
| CN | 209562503 U | * | 10/2019 |
| JP | 2001-194012 A | | 7/2001 |
| KR | 19990055507 A | | 7/1999 |
| KR | 20-2009-0002643 U | | 3/2009 |
| KR | 20150069367 A | * | 6/2015 |

(Continued)

OTHER PUBLICATIONS

English translation of KR 20170056856 A (Year: 2022).*

(Continued)

*Primary Examiner* — Steven S Anderson, II
*Assistant Examiner* — Kurt J Wolford
(74) *Attorney, Agent, or Firm* — Cantor Colburn LLP

(57) ABSTRACT

Disclosed is a smart farm system comprising: a Rankine cycle in which a first fluid passes through a pump, an evaporator, a turbine, and a condenser along a first circulation line; a heating unit configured to exchange heat with the evaporator; a valve unit which is provided between the turbine and the condenser, and configured to run the first fluid to the condenser when the temperature of the first fluid at the outlet of the turbine is a first temperature, and to bypass the first fluid to a bypass line when the temperature of the first fluid at the outlet of the turbine is a second temperature higher than the first temperature; and a smart farm configured to exchange heat with the first fluid and the heating unit via the condenser or the bypass line.

7 Claims, 3 Drawing Sheets

(56) References Cited

FOREIGN PATENT DOCUMENTS

| KR | 10-1579004 | B1 | | 12/2015 |
|---|---|---|---|---|
| KR | 101802376 | B1 | | 11/2017 |
| RU | 156857 | U1 | * | 11/2015 |

OTHER PUBLICATIONS

GPN (Year: 2006).*
GPN Accessibility Date (Year: 2022).*
English translation of KR 20150069367 A (Year: 2022).*
CN-106225318-A English translation (Year: 2016).*
RU-156857-U1 English translation (Year: 2015).*
CN-203671812-U English translation (Year: 2014).*
CN-209562503-U English translation (Year: 2019).*
CN-104913364-B English translation (Year: 2017).*
CN-203757910-U English translation (Year: 2014).*
CN-202660759-U English translation (Year: 2013).*

* cited by examiner

SMART FARM SYSTEM

CROSS-REFERENCE TO RELATED APPLICATION

This application claims under 35 U.S.C. § 119(a) the benefit of Korean Patent Application No. 10-2019-0144074 filed on Nov. 12, 2019 and Application No. 10-2019-0144075 filed on Nov. 12, 2019 the entire contents of which are incorporated herein by reference.

BACKGROUND

(a) Technical Field

The present invention relates to a smart farm system, and more particularly, to a smart farm system that circulates a working fluid at an outlet of a turbine in different cycles according to a temperature of the working fluid and circulates the working fluid in different cycles according to a season.

(b) Background Art

In general, since fossil energy that is widely used has a limited amount and environmental problems caused by pollutants to be discharged, an interest in alternative energy that can be used instead of the fossil energy is very high.

As alternative energy sources, there are tidal power to obtain energy by using the ebb and flow of the tide, wind power to obtain energy by using wind power, and solar energy using solar heat or light, and various technologies related thereto have been developed.

As one of power generation systems using such natural power, a power generating apparatus using solar heat is being introduced. As compared to other power generation, the solar generating apparatus is clean energy without pollution such as air pollution, noise, heat, and vibration, and has advantages in that there is almost no need for fuel transportation and maintenance of power generation facilities, the selection of installation locations and a facility scale can be freely set, and the life of the apparatus long and installation is easy.

The present invention is an invention relating to a system capable of configuring a smart farm by including cycles that can be applied differently depending on the temperature of the working fluid at the outlet of the turbine constituting, particularly, a Rankine cycle in the power generating apparatus using solar heat and using energy provided in the cycle.

Therefore, there is a need for a method for solving such problems.

PRIOR ART DOCUMENTS

Patent Documents

Korean Laid-open Patent Publication No. 10-1999-0055507
Korean Patent Publication NO. 10-1802376

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. An object of the present invention is to provide a system comprising a plurality of cycles that can be selectively applied according to the temperature of a working fluid at the outlet of a turbine.

The objects of the present invention are not limited to the aforementioned objects, and other objects, which are not mentioned above, will be apparently understood to those skilled in the art from the following description.

In order to achieve the objects of the present invention, there is provided a smart farm system comprising: a Rankine cycle in which a first fluid passes through a pump, an evaporator, a turbine, and a condenser along a first circulation line; a heating unit configured to exchange heat with the evaporator; a valve unit which is provided between the turbine and the condenser, and configured to run the first fluid to the condenser when the temperature of the first fluid at the outlet of the turbine is a first temperature, and to bypass the first fluid to a bypass line when the temperature of the first fluid at the outlet of the turbine is a second temperature higher than the first temperature; and a smart farm configured to exchange heat with the first fluid and the heating unit via the condenser or the bypass line.

At this time, the heating unit may comprise a second circulation line configured to provide a path through which the second fluid heated by eco-friendly energy is circulated; and a heater which is provided to store the second fluid on the second circulation line and configured to transfer heat to the evaporator.

In addition, the heater may comprise a second tank configured to store the second fluid; and a second valve member which is provided to circulate the second fluid through the second circulation line when the second fluid provided in the second tank is equal to or higher than a preset temperature.

Alternatively, the second circulation line may comprise a panel unit provided to condense solar energy and transfer the solar energy to the second fluid.

In addition, the second circulation line may comprise a second panel circulation line configured to provide a path through which the second fluid is circulated between the panel unit and the heater; and a second heating circulation line configured to provide a path through which the second fluid is discharged from the heater to flow into the heater after exchanging the heat with the evaporator.

Alternatively, the second fluid may be formed of a fluid having large specific heat.

In addition, the bypass line may comprise an adsorption refrigerator and a bypass heat exchanger configured to heat-exchange the first fluid passing through the adsorption refrigerator with the smart farm, wherein the bypass line may be formed to connect the outlet of the turbine and the outlet of the condenser.

At this time, the adsorption refrigerator may be driven by electric energy generated by the turbine.

Alternatively, the smart farm system may further comprise an energy storage system configured to store electric energy generated from the turbine.

In addition, the smart farm may exchange heat with the heating unit so as to supply thermal energy to the smart farm.

In addition, the first circulation line may comprise a cooling fan provided between the condenser and the pump so as to cool the temperature of the first fluid passing through the condenser.

The first circulation line may comprise a first tank provided between the condenser and the pump to store the first fluid passing through the condenser.

At this time, the first tank may comprise a controller configured to determine a flow rate of the first fluid passing through the first circulation line according to the temperature of the first fluid at the outlet of the turbine.

In order to achieve the objects of the present invention, there is provided a driving method of a smart farm comprising the steps of: transferring heat obtained from eco-friendly energy by a heating unit to an evaporator; running a first fluid to a condenser when the first fluid passes through the evaporator and turbine in sequence and the temperature of the first fluid at the outlet of the turbine is a first temperature and running the first fluid to a bypass line branched and provided from the outlet of the turbine when the temperature of the first fluid at the outlet of the turbine is a second temperature; and exchanging heat with the first fluid flowing through the condenser or the bypass line by a smart farm.

At this time, the driving method may comprise a step of supplying electric energy generated from the turbine to the smart farm as the first fluid passes through the turbine.

The smart farm system of the present invention for solving the above problems has the following effects.

First, stable heat supply is possible by using a water tank with high specific heat.

Second, since a plurality of cycles can be selectively applied according to the temperature of a first fluid at the outlet of the turbine, the smart farm system can be efficiently operated.

Third, electric energy and thermal energy can be variously supplied to the smart farm using eco-friendly energy, so that pollutants are not discharged during system operation.

The effects of the present invention are not limited to the aforementioned effect, and other effects, which are not mentioned above, will be apparently understood to those skilled in the art from the description of the appended claims.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
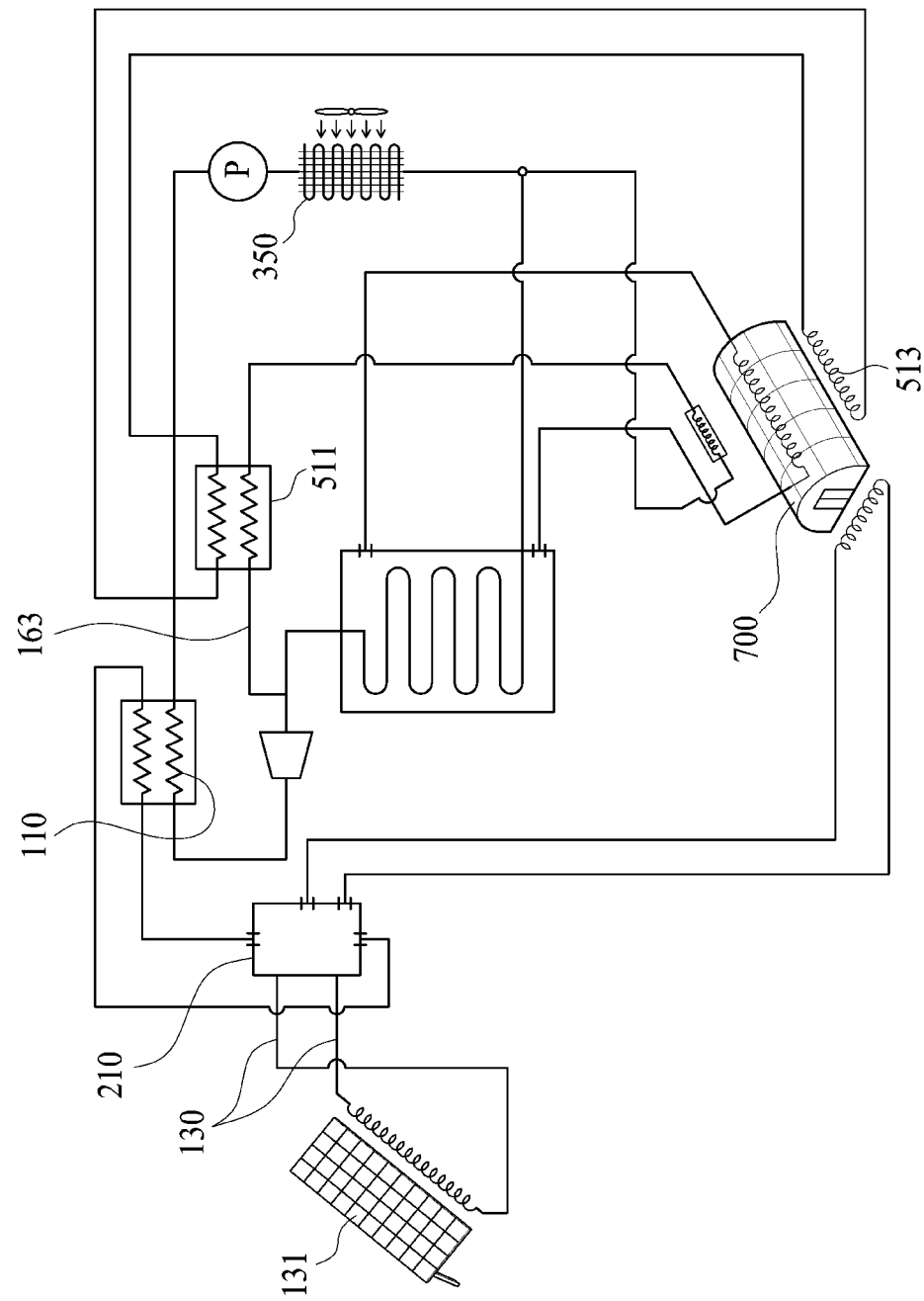
FIG. 1 is a schematic diagram of a smart farm system of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a preferred embodiment of the present invention, in which objects of the present invention can be realized in detail, will be described with reference to the accompanying drawings. In describing the embodiment, like names and like reference numerals are used with respect to like components and the resulting additional description thereof will be omitted.

In addition, in the description of the embodiments of the present invention, it will be noted that components having like functions just use like names and like reference numerals, and are not substantially identical to those of the prior art.

Terms used in the embodiments of the present invention are to be used only to describe specific embodiments, and are not intended to limit the present invention. A singular form may include a plural form unless otherwise clearly meant in the context.

In the embodiments of the present invention, it should be understood that term "comprising" or "having" indicates that features, numbers, steps, operations, components, parts or combinations thereof described in this specification are present, but do not exclude a possibility of presence or addition of one or more other features, numbers, steps, operations, components, parts or combinations thereof, in advance.

A smart farm system of the present invention will be described with reference to FIG. 1. FIG. 1 is a schematic diagram of the smart farm system of the present invention.

The smart farm system of the present invention may include a Rankine cycle, a heating unit, a valve unit 165, and the smart farm 700.

The Rankine cycle is a cycle in which a first fluid passes through a pump 340, an evaporator 360, a turbine 320, and a condenser 370 along a first circulation line, and it is preferred that the smart farm system of the present invention consists of an organic Rankine cycle (ORC) using an organic material with a lower evaporation temperature than steam.

This is because the smart farm system of the present invention uses eco-friendly energy, so it is difficult to assume that the temperature rises enough to drive the turbine 320 of a general Rankine Cycle, but the present invention is not limited thereto.

The heating unit may exchange heat with the evaporator 360 constituting the Rankine cycle.

Since the heating unit may utilize eco-friendly energy, the smart farm system of the present invention has an effect that no separate pollutants are discharged during the operation process.

The valve unit 165 is provided between the turbine 320 and the condenser 370 so that the first fluid may be circulated by selecting a cycle according to the temperature of the working fluid at the outlet of the turbine 320.

That is, when the temperature of the first fluid at the outlet of the turbine 320 is a first temperature, the valve unit 165 may be provided to run the first fluid to the condenser 370, and when the temperature of the first fluid at the outlet of the turbine 320 is a second temperature higher than the first temperature, the valve unit 165 may be provided to bypass the first fluid to a bypass line 163.

The smart farm system of the present invention may circulate the first fluid selectively through a cycle according to the temperature of the first fluid at the outlet of the turbine 320 constituting the Rankine cycle by the control process of the valve unit 165, thereby maximizing the efficiency of the entire cycle.

The smart farm 700 may exchange heat with the first fluid via the condenser 370 or the bypass line 163.

The smart farm 700 is a farm in which information and communication technology (ICT) is grafted into the agricultural field, and may measure and analyze an environment of a crop cultivation facility using Internet of Things technology, and may be appropriately controlled according to the analysis result.

In particular, the smart farm system of the present invention may properly grow crops through air conditioning, that is, the control of temperature or humidity in the environment of the smart farm 700. In addition, as described above, since the smart farm system of the present invention may use eco-friendly energy as an energy source in this process, the system is suitable for realizing the purpose of the smart farm 700.

In this case, the heating unit may include a second circulation line 130 and a heater 310.

The second circulation line 130 may provide a path through which the second fluid heated by the eco-friendly energy is circulated.

For example, when the eco-friendly energy is solar energy, the second circulation line 130 may be provided with a panel unit 131 capable of condensing solar energy. The panel unit 131 may be a solar panel.

However, the eco-friendly energy is not limited to the solar energy, and a configuration capable of storing the eco-friendly energy may be provided in the second circulation line 130 according to a type of eco-friendly energy.

In addition, after the second fluid heated by the eco-friendly energy is stored in the heater 110 provided on the second circulation line 130, the heat may be transferred to the evaporator 360.

In this case, the second circulation line 130 may include a second panel circulation line and a second heating circulation line. In addition, the heater 110 may include a second tank 210 and a second valve member.

The second panel circulation line may provide a path through which the second fluid is circulated between the panel unit 131 and the heater 110.

The second heating circulation line may provide a path through which the second fluid is discharged from the heater 110 to be heat-exchanged with the evaporator 360 and then flows into the heater 110.

The second tank 210 is configured to store the second fluid, and may include an insulating material to prevent the heat of the second fluid from being leaked to the outside.

Further, the second valve member may be provided to circulate the second fluid through the second circulation line 130 when the second fluid provided in the second tank 210 is equal to or higher than a preset temperature.

That is, while the second fluid receives the heat from the eco-friendly energy and is stored in the second tank 210, and the second fluid stored in the second tank 210 transfers the heat to the first fluid, which is the working fluid of the Rankine cycle. In the process of transferring the heat, the above-described second fluid may be controlled by interlocking with the second panel circulation line, the second heating circulation line, and the second valve member.

Accordingly, the second fluid heated by the eco-friendly energy is stored in the second tank 210 and then circulated by the second valve member according to the amount of heat required by the first fluid, which is the working fluid of the Rankine cycle, and the heat may be transferred to the first fluid.

In this case, it is preferred that the second fluid is formed of a fluid having large specific heat such as water.

This is because the eco-friendly energy is difficult to function as a heat source that always supplies constant heat. That is, since the second fluid is formed as a fluid having large specific heat to maximize a heat capacity, the second fluid may store the thermal energy of eco-friendly energy to be irregularly provided and then supply the heat when the smart farm system of the present invention requires.

However, the second fluid is not necessarily limited thereto, and it will be apparent to those skilled in the art that the second fluid may vary depending on the configuration of the heater 110 that may be selectively installed according to an environment as described above.

In addition, the bypass line 163 may include an adsorption refrigerator 511 and a bypass heat exchanger 513, and the bypass line 163 may be formed to connect the outlet of the turbine 320 and the outlet of the condenser 370.

The adsorption refrigerator 511 may be a generally well-known adsorption refrigerator, as a system that uses silica gel, zeolite, or the like as an adsorbent and is provided with an evaporator, an adsorption tower, a condenser, and a valve to effectively recycle energy by using the heat transferred from the second fluid as a driving source.

The bypass heat exchanger 513 may heat-exchange the first fluid passing through the adsorption refrigerator 511 with the smart farm 700.

In this case, the adsorption refrigerator 511 may be driven by electric energy generated by the turbine 320.

In addition, the smart farm system of the present invention may further include an energy storage system (ESS) for storing the electric energy generated by the turbine 320.

The electric energy generated by the turbine 320 may be stored through the ESS, and then provided to the smart farm 700 when required or to a configuration that requires electric energy.

In addition, the smart farm 700 may be characterized to exchange the heat with the heating unit so as to supply thermal energy to the smart farm 700.

That is, the heating unit is partially branched and formed to transfer the heat of the second fluid to the smart farm 700, so that high-temperature heat may be transferred to the smart farm 700.

Accordingly, the smart farm system of the present invention may provide cooling and heating to the smart farm 700 by interlocking between the above-described cycles even if there is no installation of a separate cooling and heating device.

In addition, the first circulation line may include a cooling fan 350 provided between the condenser 370 and the pump 340 so as to cool the temperature of the first fluid passing through the condenser 370.

The cooling fan 350 may be driven by the above-described ESS, and may remove the thermal energy of the first fluid flowing into the pump 340 to increase the efficiency of the Rankine cycle.

In addition, the first circulation line includes a first tank, and the first tank may control the flow of the first fluid by a controller.

The first tank may be provided between the condenser 370 and the pump 340 to store the first fluid passing through the condenser 370.

In addition, the controller may determine the flow rate of the first fluid passing through the first circulation line according to the temperature of the first fluid at the outlet of the turbine 320.

Hereinafter, a driving method of the smart farm 700 using the smart farm system of the present invention will be described.

Among the contents to be described below, configurations of the same terms as those described above may perform the same or similar functions or implement effects, and it will be understood that the detailed descriptions thereof may be replaced with the aforementioned contents.

The driving method of the smart farm 700 of the present invention may include a heat transferring step, a cycle driving step, and a heat exchanging step.

The heat transferring step may be a step in which the heating unit transfers heat obtained from eco-friendly energy to the evaporator 360.

As described above, the heating unit may be provided with a device capable of storing the eco-friendly energy according to a type of eco-friendly energy.

The cycle driving step may be a step in which the first fluid sequentially passes through the evaporator 360 and the turbine 320, the first fluid flows to the condenser 370 when the temperature of the first fluid at the outlet of the turbine 320 is a first temperature, and the first fluid flows to the bypass line 163 provided to be branched from the turbine outlet when the temperature of the first fluid at the outlet of the turbine 320 is a second temperature.

Specifically, the first fluid may be formed in a Rankine cycle of sequentially circulating the evaporator 360, the turbine 320, the condenser 370, and the pump 340.

At this time, the first fluid containing high-temperature heat via the evaporator 360 passes through the turbine 320 to generate electric energy, and may flow to the condenser 370 or flow along the bypass line 163 according to the temperature at the outlet of the turbine 320.

When the first fluid flows to the condenser 370, the first fluid passing through the condenser 370 flows into the pump 340, and at this time, the condenser 370 may exchange heat with the smart farm 700.

In addition, when the first fluid flows along the bypass line 163, the first fluid may flow between the condenser 370 and the pump 340 after exchanging the heat with the smart farm 700 via the above-described adsorption refrigerator 511.

Figure 2:
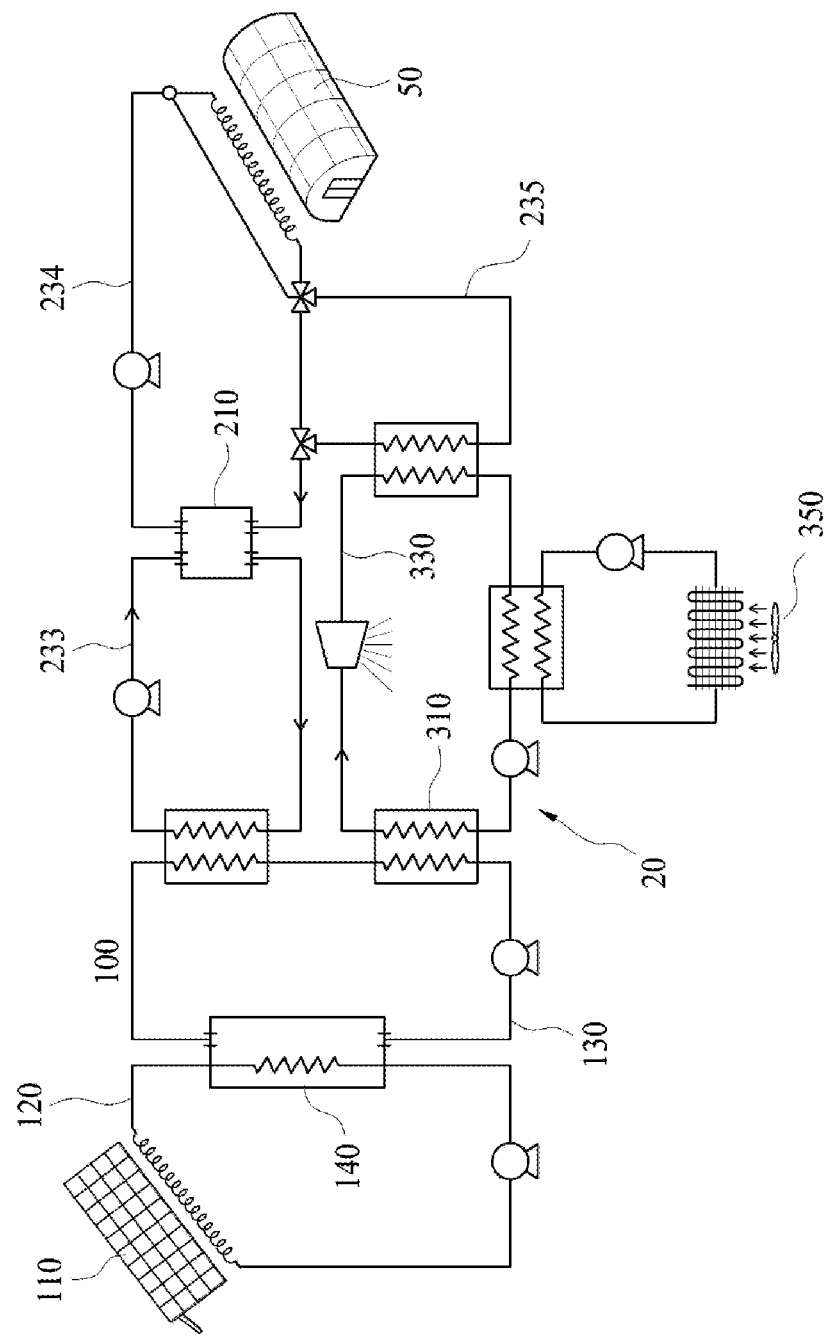
FIGS. 2 and 3 are diagrams illustrating the smart farm system of the present invention.
Figure 3:
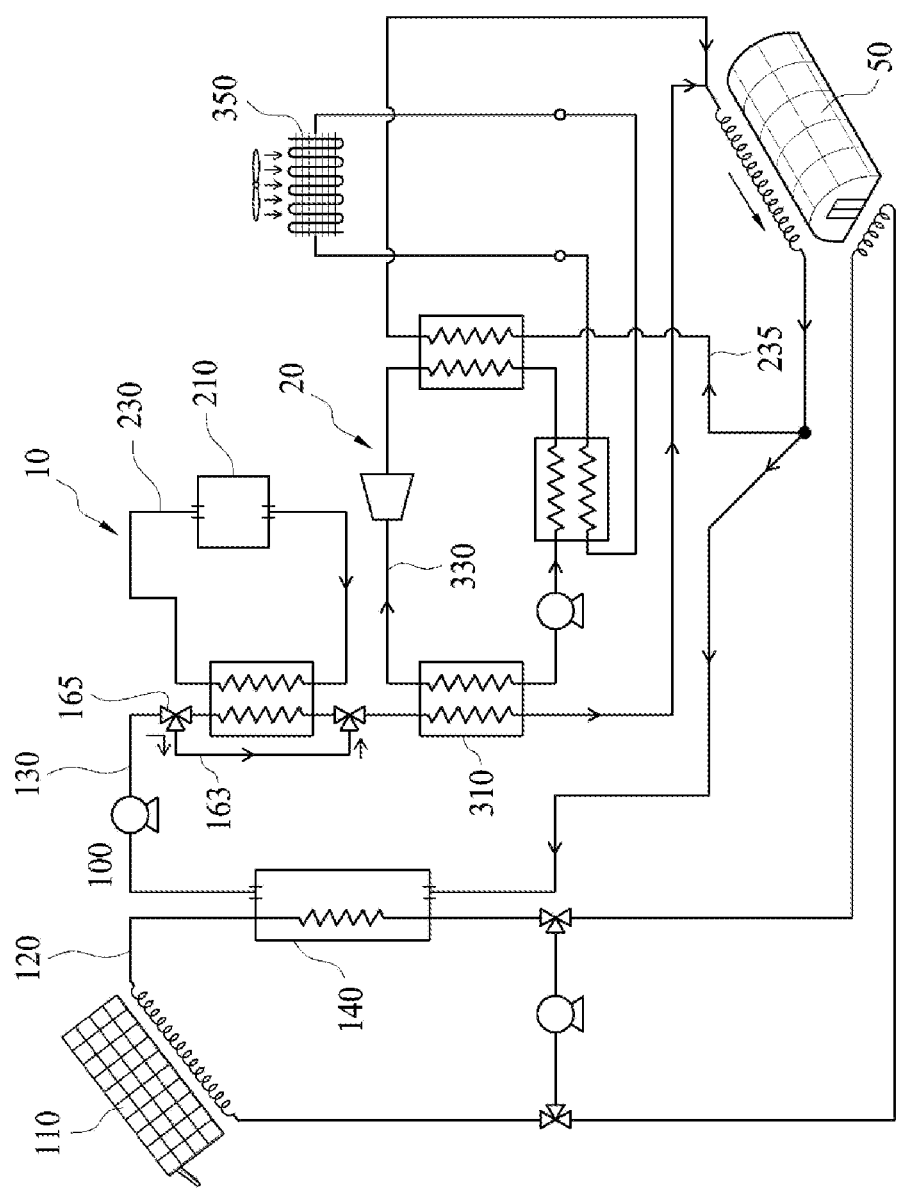

The smart farm system of the present invention will be described with reference to FIGS. 2 and 3. FIGS. 2 and 3 are diagrams illustrating the smart farm system of the present invention.

The smart farm system of the present invention may include a heat exchange unit 100 and a smart farm 700.

The heat exchange unit 100 is provided with a path through which the first fluid is heated by eco-friendly energy and the first fluid is circulated, and may be a configuration which measures an atmospheric environment to transfer the heat of the first fluid to a first cycle 10 or a second cycle 20 according to a preset value.

In order to measure the atmospheric environment, a sensor capable of measuring the temperature or humidity may be provided to acquire data thereof. This will be described below.

In addition, the smart farm 700 may exchange the heat with the first cycle 10 or the second cycle 20.

The smart farm 700 is a farm in which information and communication technology (ICT) is grafted into the agricultural field, and may measure and analyze an environment of a crop cultivation facility using Internet of Things technology, and may be appropriately controlled according to the analysis result.

In particular, the smart farm system of the present invention may properly grow crops through air conditioning, that is, a control of temperature or humidity in the environment of the smart farm 700. In addition, as described above, since the smart farm system of the present invention may use eco-friendly energy as an energy source in this process, the system is suitable for realizing the purpose of the smart farm 700.

Electric energy or thermal energy generated by the smart farm system of the present invention to be described below is provided to the smart farm 700 or provided for heat exchange, so that there is an advantage that the smart farm 700 can be driven without adding separate energy.

In this case, the heat exchange unit 100 may include a heater 110, a first circulation line 120 and a second circulation line 130.

The heater 110 may heat the first fluid by the eco-friendly energy.

The first circulation line 120 may provide a path through which the first fluid is circulated via the heater 110.

In addition, the second circulation line 130 may provide a path through which the first fluid is circulated via the first cycle 10 or the second cycle 20.

That is, the heat of the first fluid may be transferred through the heat exchange unit 100 with the thermal energy obtained via the heater 110 through the first circulation line 120 by passing through the first cycle 10 or the second cycle 20 to be described below through the second circulation line 130.

For example, when the eco-friendly energy is solar energy, the first circulation line 120 may be provided with a panel to condense solar energy and transfer the solar energy to the first fluid.

However, the eco-friendly energy is not limited to solar energy, and a configuration capable of storing the eco-friendly energy may be provided in the second circulation line 130 according to a type of eco-friendly energy.

In addition, the heat exchange unit 100 may include a first tank 140 and a first valve 145.

The first tank 140 may store the first fluid, and may include an insulating material to prevent the heat of the first fluid from being transferred to the air.

Further, the first valve 145 may be provided so that the first fluid is circulated through the second circulation line 130 when the first fluid stored in the first tank 140 corresponds to a preset value.

For example, if the first fluid has a small amount of heat obtained from the eco-friendly energy, it is impossible to drive the first cycle 10 or the second cycle 20 through the heat exchange unit 100 by circulating the first fluid, and if possible, the efficiency thereof may also be significantly reduced.

Accordingly, the first fluid transfers the heat to the first cycle 10 or the second cycle 20 along the second circulation line 130 depending on whether the first valve 145 is operated, or is continuously circulated through the first circulation line 120 to accumulate the heat through eco-friendly energy.

In this case, it is preferred that the first fluid is formed of a fluid having large specific heat, such as water.

This is because the eco-friendly energy is difficult to function as a heat source that always supplies constant heat. That is, since the first fluid is formed as a fluid having large specific heat to maximize a heat capacity, the first fluid may store the thermal energy of eco-friendly energy to be irregularly provided and then supply the heat when the smart farm system of the present invention requires.

However, the first fluid is not necessarily limited thereto, and it will be apparent to those skilled in the art that the first fluid may vary depending on the configuration of the heater 110 that may be selectively installed according to an environment as described above.

In addition, the heat exchange unit 100 may include a controller 160.

When the atmospheric environment corresponds to a first value, the controller 160 may be a configuration to transfer the heat of the first fluid to the first cycle 10 when the atmospheric environment corresponds to a first value, and to transfer the heat of the first fluid to the second cycle 20 when the atmospheric environment corresponds to a second value.

In this case, the controller 160 may include a first bypass line 163 and a second valve 165 to control the flow of the first fluid.

The first bypass line 163 may provide a path through which the first fluid is circulated by bypassing the first cycle 10.

In addition, the second valve 165 may determine whether the first fluid is circulated via the first bypass line 163.

That is, according to the operation of the second valve 165, when the temperature measured by the heat exchange unit 100 corresponds to the first value, the first fluid flows to the first cycle 10 and the heat of the first fluid may be transferred to the first cycle 10.

In addition, when the temperature measured by the heat exchange unit 100 corresponds to the second value, the first fluid is bypassed to the second cycle 20 along the first bypass line 163 by the second valve 165 and the heat of the first fluid may be transferred to the second cycle 20.

By the function of the controller 160, the smart farm system of the present invention may maximize the thermal energy obtained from the eco-friendly energy.

As an embodiment of the smart farm system of the present invention, a case where the temperature of the atmospheric environment is high, such as in summer, will be described.

Specifically, when the temperature of the first value is set higher than the temperature of the second value, the first cycle 10 may include an adsorption refrigerator 511 and a first cycle line 230.

The adsorption refrigerator 511 may be a generally well-known adsorption refrigerator, as a system that uses silica gel, zeolite, or the like as an adsorbent and is provided with an evaporator, an adsorption tower, a condenser, and a valve to effectively recycle energy by using the heat transferred from the first fluid as a driving source.

It is preferable that the second fluid is formed of a fluid having high specific heat like the first fluid. This is because a refrigerant of the adsorption refrigerator 511 is generally formed of a fluid having large specific heat, such as water. However, the adsorption refrigerator 511 is not necessarily limited thereto, and it is obvious to a person skilled in the art that the adsorption refrigerator 511 may be selectively installed according to the environment as described above.

In addition, the first cycle line 230 may provide a circulation path of the second fluid circulated through the first cycle 10.

In this case, the first cycle line 230 may include a second tank 210 and a third valve 232.

The second tank 210 may store the second fluid, and may include an insulating material to prevent the heat of the second fluid from being transferred to the air.

In addition, when the second fluid stored in the second tank 210 corresponds to a preset value, the third valve 232 runs the second fluid to the smart farm 700 to transfer the heat of the second fluid to the smart farm 700.

The heat of the second fluid may be transferred to the smart farm 700 according to whether the third valve 232 is operated or stored in the second tank 210 to be circulated through the first cycle line 230 if necessary.

Specifically, the first cycle line 230 may include a 1-1 cycle line 233 and a 1-2 cycle line 234.

The 1-1 cycle line 233 may provide a path through which the second fluid is circulated between the adsorption refrigerator 511 and the second tank 210.

In addition, the 1-2 cycle line 234 may provide a path through which the second fluid is heat-exchanged with the smart farm 700 via the second tank 210.

That is, the heat of the second fluid may be transferred to the smart farm 700 along the 1-2 cycle line 234 or the second fluid may be continuously circulated through the 1-1 cycle line 233 depending on whether the third valve 232 is operated or not to drive the adsorption refrigerator 511.

Next, as another embodiment of the smart farm system of the present invention, a case where the temperature of the atmospheric environment is low, such as in winter, will be described.

Specifically, when the temperature of the first value is set higher than the temperature of the second value, the second cycle 20 may include a heater 310, a turbine 320, a condenser 370, a pump 340, and a second cycle line 330.

That is, the second cycle 20 is a Rankine cycle, and is preferably configured as an organic Rankine cycle (ORC) in which a third fluid is circulated through the pump 340, the evaporator, the turbine 320 and the condenser 370 along the second circulation line 130, and the second cycle 20 uses an organic material having an evaporation temperature lower than steam.

This is because the smart farm system of the present invention uses eco-friendly energy, so it is difficult to assume that the temperature rises enough to drive the turbine 320 of a general Rankine Cycle, but the present invention is not limited thereto.

In addition, the second cycle 20 may include an energy storage system (ESS).

The electric energy generated by the turbine 320 may be stored through the ESS, and then provided to the smart farm 700 when required or to a configuration that requires electric energy.

In addition, the first cycle line 230 may include a 1-3 cycle line 235 and a fourth valve 236.

The 1-3 cycle lines 235 may provide a path through which the second fluid is heat-exchanged with the condenser 370.

In addition, the fourth valve 236 may determine whether the second fluid is circulated via the 1-3 cycle line 235.

Depending on whether the fourth valve 236 is operated or not, the second fluid circulated through the first cycle 10 is heat-exchanged with the condenser 370 and then the cooling heat of the second fluid is transferred to the condenser 370, thereby increasing the efficiency of the condenser 370.

In addition, the second cycle 20 may include a cooling fan 350 that cools the condenser 370.

The cooling fan 350 may be driven by the above-described ESS, and increase the efficiency of the condenser 370.

In addition, when the atmospheric environment corresponds to the second value, the first fluid may be characterized to be circulated via the smart farm 700 after the heat is transferred to the second cycle 20.

In other words, even if the heat is transferred to the second cycle 20, the first fluid contains a significant amount of heat, and thus, the heating of the smart farm 700 may be provided by transferring the high-temperature heat to the smart farm 700.

Alternatively, the second circulation line 130 is partially branched and formed to transfer the heat of the first fluid to the smart farm 700, so that high-temperature heat may be transferred to the smart farm 700.

Accordingly, the smart farm system of the present invention may provide the cooling and heating to the smart farm 700 by interlocking between the above-described cycles even if there is no installation of a separate cooling and heating device.

Hereinafter, a driving method of the smart farm 700 using the smart farm system of the present invention will be described.

Among the contents to be described below, configurations of the same terms as those described above may perform the same or similar functions or implement effects, and it will be understood that the detailed descriptions thereof may be replaced with the aforementioned contents.

The driving method of the smart farm 700 of the present invention may include an atmospheric environment measuring step, a heat transferring step, a first cycle 10 driving step, a second cycle 20 driving step, and a heat exchanging step.

The atmospheric environment measuring step may be a step of measuring the atmospheric environment by the heat exchange unit 100 described above.

The heat transferring step may be a step of transferring the heat of the first fluid heated by eco-friendly energy to the first cycle 10 or the second cycle 20 according to the measured atmospheric environment.

The first cycle 10 driving step may be a step in which the second fluid circulated through the first cycle 10 passes through the adsorption refrigerator 511.

The second cycle 20 driving step may be a step in which the third fluid circulated through the second cycle 20 passes through the heater 310, the turbine 320, the condenser 370 and the pump 340.

That is, as described above, the second cycle 20 driving step may be a configuration in which the third fluid is circulated through the Rankine cycle.

In addition, the heat exchanging step may be a step of exchanging the heat of the second fluid or the third fluid with the smart farm 700.

In this case, the step in which the third fluid passes through the heater 310, the turbine 320, the condenser 370, and the pump 340 may be a step of supplying electric energy generated by the turbine 320 to the smart farm 700.

As described above, the driving method of the smart farm 700 of the present invention provides the electric energy and the cooling and heating to the smart farm 700 by the combined action of the heat transfer step, the first cycle 10 and the second cycle 20, thereby efficiently managing eco-friendly energy.

As described above, the preferred embodiments according to the present invention have been described and it will be apparent to those skilled in the art that the present invention can be materialized in other specific forms without departing from the gist or scope thereof in addition to the above-described embodiments. Therefore, the aforementioned embodiments are not limited but should be considered to be illustrative, and accordingly, the present invention is not limited to the aforementioned description and may be modified within the scope of the appended claims and a range equivalent thereto.

What is claimed is:

1. A smart farm system comprising:
a heat exchange unit which is provided with a path through which a first fluid is heated by eco-friendly energy and the first fluid is circulated, and configured to measure an atmospheric environment to transfer the heat of the first fluid to a first cycle or a second cycle according to a preset value; and
a smart farm configured to exchange heat with the first cycle or the second cycle,
wherein the heat exchange unit comprises
a heater configured to include a panel to condense solar energy and transfer the solar energy to the first fluid and heat the first fluid by the eco-friendly energy;
a first circulation line configured to provide a path through which the first fluid is circulated via the heater; and
a second circulation line configured to provide a path through which the first fluid is circulated via the first cycle or the second cycle,
wherein the first fluid is circulated via the smart farm after the heat of the first fluid is transferred to the second cycle when the atmospheric environment corresponds to a second value.

2. The smart farm system of claim 1, wherein the heat exchange unit comprises
a first tank configured to store the first fluid; and
a first valve provided so that the first fluid is circulated through the second circulation line when the first fluid stored in the first tank corresponds to a preset value.

3. The smart farm system of claim 2, wherein the heat exchange unit comprises a controller configured to transfer the heat of the first fluid to the first cycle when the atmospheric environment corresponds to a first value and to transfer the heat of the first fluid to the second cycle when the atmospheric environment corresponds to a second value corresponding to a relatively higher temperature than the first value,
wherein the controller comprises
a bypass line provided so that the first fluid is circulated by bypassing the first cycle; and
a second valve configured to determine whether the first fluid is circulated or not via the bypass line.

4. The smart farm system of claim 3, wherein the second cycle comprises
a heater provided so that a third fluid is heat-exchanged with the first fluid; and
a second cycle line configured to provide a circulation path through which the third fluid passing through the heater flows into the heater via a turbine, a condenser, and a pump.

5. The smart farm system of claim 4, wherein the second cycle comprises an energy storage system configured to store electric energy generated by the turbine.

6. The smart farm system of claim 5, wherein the second cycle comprises a cooling fan configured to cool the condenser.

7. The smart farm system of claim 1, wherein the second circulation line is partially branched and formed so as to transfer the heat of the first fluid to the smart farm.

* * * * *